W. Tweedle.
Making Gas and Water-Cocks.

Nº 89,184.            Patented Apr. 20, 1869.

Witnesses.
J. K. Hopkins
Frank A. Jackson.

Inventor
Wm. Y. Tweedle
By his Atty. Wm. C. Wood

WILLIAM TWEEDLE, OF PROVIDENCE, RHODE ISLAND.

Letters Patent No. 89,184, dated April 20, 1869.

IMPROVED TOOL FOR MAKING PLUGS FOR GAS AND WATER-COCKS.

The Schedule referred to in these Letters Patent and making part of the same.

*To all whom it may concern:*

Be it known that I, WILLIAM TWEEDLE, of the city and county of Providence, in the State of Rhode Island, have invented a certain new and useful Lathe-Tool for Turning and Boring Plugs for Gas-Cocks, &c., and that the following specification, taken in connection with the drawings furnished and forming a part of the same, is a true, clear, and exact description thereof.

It is a well-known fact that most of the brass gas or water-cocks have tapering plugs, with a square rabbeted shoulder at the small end; also that the small end is drilled to a sufficient depth to admit of the cutting of a female screw, for the adjustment of a screw and cap, by means of which the ordinary wear of the plug can be overcome, by drawing the plug inward, in the well-known and usual manner.

The drilling of the hole, the turning of the taper and then of the shoulder, have hitherto been the result of separate operations, by the use of ordinary drilling and turning-tools.

The object of my invention is to enable the skilled mechanic by its use, to execute all of these operations at one time, thereby practically securing complete uniformity, rapidity of execution, and economy in manufacture. Reference being had to the drawings, Figure 1 represents in perspective one of my lathe-tools complete.

A is the body of the tool, made of cast-iron, or other suitable metal. It is secured to the head spindle of the lathe by means of a screw-thread cut within, marked A A in fig. 2.

B represents the main cutting-tool, with its edge so advanced as to cut a true taper in the recess within the body of the tool.

C represents an auxiliary cutter, for recessing the shoulder at the small end of the plug.

D represents a brass plug, inserted to show the relative arrangement of parts.

E represents set-screws, controlling the cutter B. The auxiliary cutter C is similarly provided.

Figure 2 represents same as fig. 1, in vertical longitudinal section; same parts lettered alike.

A A represent the screw-thread before referred to, by means of which the tool is attached to the head spindle of the lathe.

F represents a drill, advanced from the rear of the tool, and held in place by set-screw G, shown in dotted lines.

D D represent the shoulders in plug D, cut by the auxiliary cutter C.

Figure 1:
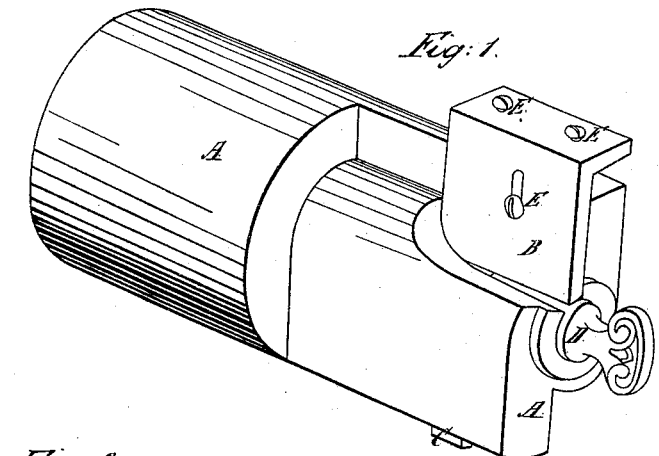
Figure 3:
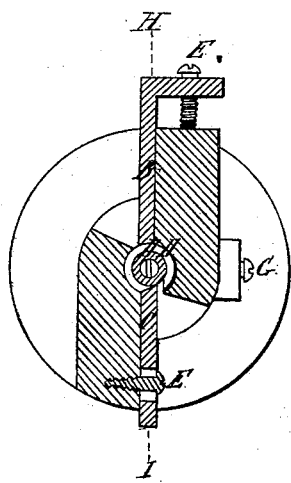
Figure 3 represents in cross vertical section, the lathe-tool at line H to I, as shown in fig. 2; parts lettered as in other figures.
Figure 2:
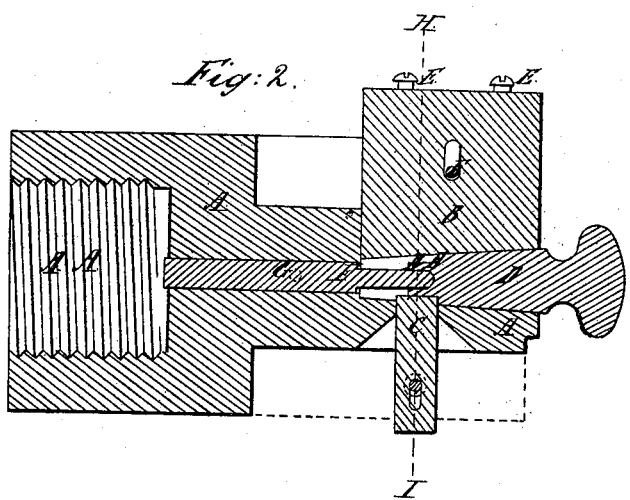
Figure 4:
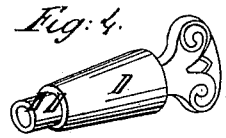
Figure 4 represents a plug after having been turned and drilled in the tool described.

The operation of the lathe-tool is as follows:

We will first suppose that a model plug of exact size and taper with hole at the small end drilled to a proper depth has been finished up carefully, of cast-iron, or other metal, to serve as a guide, like which, plugs for use are to be made. By inserting this model plug into the recess in the body of the tool, the cutters B and C can be properly advanced to correspond with the outlines of the same. The drill F can also be advanced from the rear, to the required depth. The set-screws are then tightened upon cutters and drill. The model is then withdrawn, and the tool attached to the head spindle, when it is ready for service. The rough plugs being of cast-metal, as usual, are held in a hand-tool, or wrench prepared for the purpose, and inserted into the cutting-recess. The result is obvious: by pressing it forward, the cutter B forms the taper, the cutter C the shoulder, while the drill F performs its part in making the hole at the small end.

Having thus described my invention,

I claim as new, and desire to secure by Letters Patent—

The improved device, herein described, consisting of the body A, cutters B and C, and drill F, combined substantially as set forth.

WILLIAM TWEEDLE.

Witnesses:
CHARLES SELDEN,
JOHN C. PURKIS.